United States Patent Office 3,512,937
Patented May 19, 1970

3,512,937
PROCEDURE FOR CONTINUOUS NITROGEN DIOXIDE ANALYSIS
Ferdinand Schulze, 3205 Fordham Road, Wilmington, Del. 19807
Filed June 6, 1967, Ser. No. 643,927
Int. Cl. G01n 21/06
U.S. Cl. 23—232                                10 Claims

ABSTRACT OF THE DISCLOSURE

Use of 1-amino-2,5-benzenedisulfonic acid as the diazotizable compound together with N-(1-naphthyl)ethylenediamine dihydrochloride as the coupling compound makes possible a highly improved system for continuously analyzing air for nitrogen dioxide which, in turn, makes possible the employment of more compact and more efficient conventional apparatus.

DISCLOSURE

Figure 1:
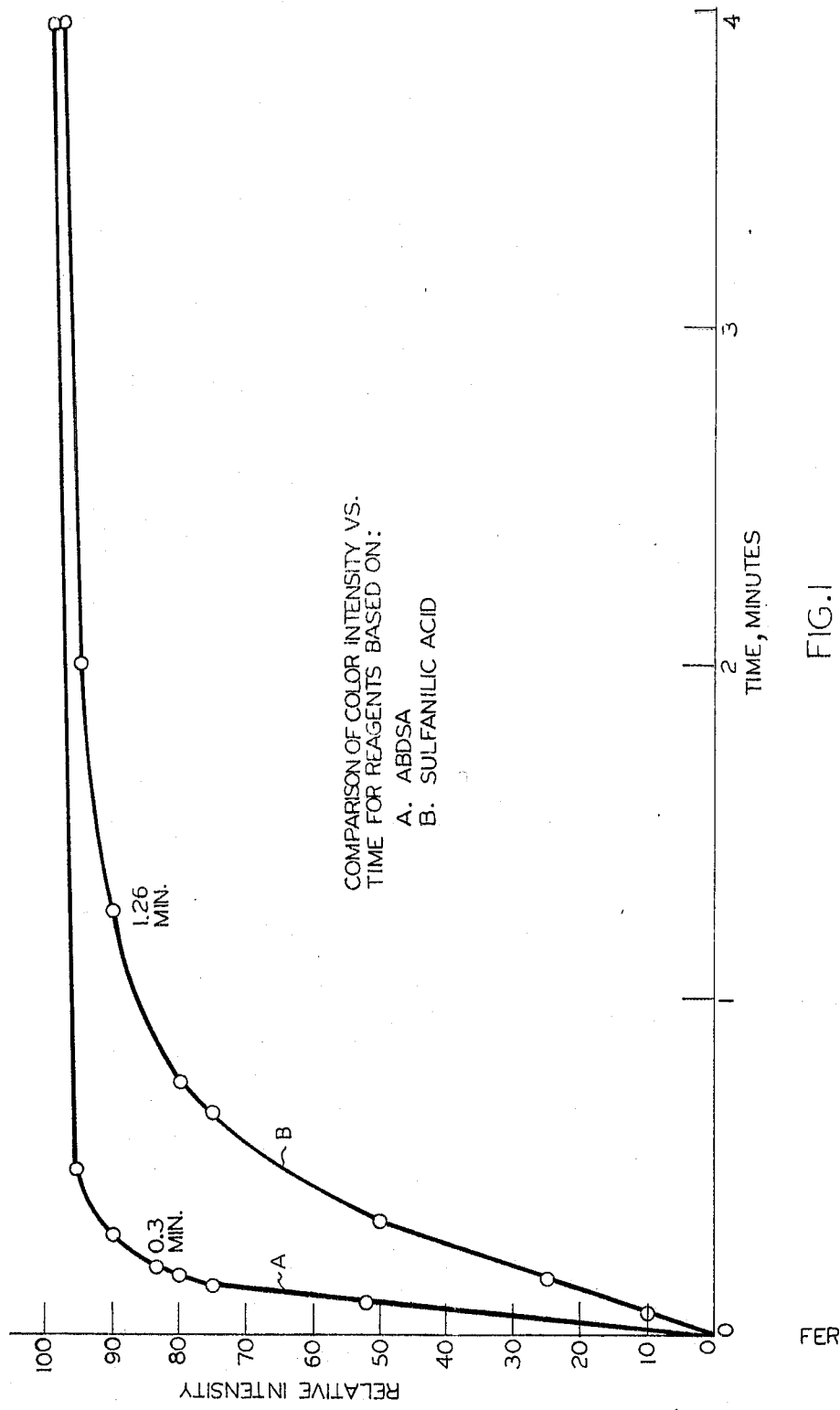

This invention relates to a new and improved system and reagent formulation for continuously analyzing air, inert gases and the like for micro amounts of nitrogen dioxide.

Nitrogen dioxide is one of the more serious air pollutants and health hazards and the accurate and unequivocal measurement of its concentration is an important index of air pollution. Because of the recognized deleterious effects of nitrogen dioxide on animal and plant life as well as on durability of industrial products increased attention is being given to testing the effects of nitrogen dioxide in environmental chambers. Such equipment requires analytical instrumentation for continuously analyzing, recording and controlling the concentration of nitrogen dioxide.

The desirable attributes of modern continuous air monitoring systems are:

(1) High sensitivity,
(2) Specific response to material being analyzed for,
(3) Freedom from interference by other pollutants,
(4) Rapid instrumental response to fluctuations in pollutant content of the atmosphere,
(5) Capacity for unattended operation for periods of up to a week or more,
(6) Simple procedures for routine operation and maintenance,
(7) Freedom from accidental malfunctioning,
(8) Portability of apparatus, and
(9) Economical operation.

These attributes are equally desirable in analyzer-controllers for controlling concentration of pollutants in environmental chambers, in fact, rapid instrumental response and freedom from interference by other pollutants are prerequisite.

CURRENT PRACTICE

Because of its inherent sensitivity and specificity the Griess reaction, originally described in 1879 and involving the formation of an azo dye, has become the accepted reaction for determining trace amounts of nitrite ion and hence nitrogen dioxide. The general reactions involve formation of nitrous acid by reaction of nitrogen dioxide with water, diazotization of an aromatic amine by nitrous acid, and coupling the diazo compound with a coupling reagent to form an azo dye. Various aromatic amines have been examined for speed of reaction and sensitivity but in current practice the choice has narrowed down to either sulfanilic acid or sulfanilamide. 1-naphthylamine was early proposed as a coupling reagent but today one of its derivatives, N-(1-naphthyl)ethylenediamine dihydrochloride, is the preferred coupling reagent because of its more rapid coupling rate and deeper color of the resultant azo dye.

At the present time, the most frequently used azo dye reagent in continuous analyzers is a formulation containing 5.0% acetic acid, 0.5% sulfanilic acid (diazotizing compound) and 0.005% N-(1-naphthyl)ethylenediamine dihydrochloride (hereafter referred to by the abbreviation NEDA) (the coupling compound) in water which is known as "modified Saltzman reagent." The procedure employed follows the tentative test method issued by the American Society for Testing and Materials, ASTM D2012—63T, which may be summarized as follows:

Nitrogen dioxide is absorbed by passing the air sample and modified Saltzman reagent, in volume ratio of from 100:1 to 1000:1, concurrently through a special absorber that provides adequate contact for quantitative absorption of this gas. Following diazotization and coupling, the pink dye is measured continuously in a recording colorimeter by comparison with unreacted reagent in a similar reference cell.

DEFICIENCIES IN CURRENT PROCEDURES

The present ASTM procedure lacks nothing in sensitivity or specificity for trace amounts of nitrogen dioxide but otherwise, however, the procedure is deficient in a number of respects as have been pointed out in the technical literature. The shortcomings are to a considerable extent due to defects in the chemistry of the analytical system, however, some of these chemical deficiencies require mechanical concessions in the apparatus which further contribute to the lack of smooth and efficient operability. The various deficiencies and proposals that have been tried for avoiding them include the following:

(1) It has been pointed out in the technical literature that the use of acetic acid in the modified Saltzman reagent is a corrosion and hygienic nuisance. The acetic acid corrodes metal parts, it softens some plastic parts and its odor is objectionable.

(2) To avoid the acetic nuisance, it has been proposed to substitute other organic acids such as citric or tartaric acid for adjusting pH of the reagent. While this eliminates the odor and corrosion problem it introduces a new and just as bothersome problem. Citric and tartaric acid solutions, in concentrations suitable for this use, are nutrient media for slimes and molds. Mold spores floating in the air are drawn into the apparatus with the sample air and the resultant growths clog the absorber and contaminate the reagent.

(3) Instrumental response to rapid fluctuations in nitrogen dioxide concentration is limited by the speed of the chemical reaction used in measurement. This deficiency is objectionable in air monitoring and it is a very serious defect in analyzer-controllers which must have rapid response to maintain uniform concentrations of nitrogen dioxide in environmetal chambers. It has been determined and reported in the literature that presently used reagents require at least 6 minutes for development of full color response. This necessitates use of over size gas absorbers and long lag times in the apparatus between the gas absorber and the optical measuring cell which results in slow instrumental response of 10 to 15 minutes to changes in concentration. In addition to causing slow instrumental response, this time lag also causes peaks and dips in concentration to be averaged out due to reciprocal blending of successive increments of reagent. Various reagent formulations, some based on the use of sulfanilamide in place of sulfanilic acid, plus activators for accelerating the rate of reaction have been proposed but experience with these formulations demonstrates little if any practical increase in reaction rate.

(4) In any type of gas liquid absorber, there is an initial interface between gas and reagent. Because of capillary effects, the reagent creeps back along the walls of the absorption apparatus into the gas zone. If the gas is not saturated with moisture, the reagent in the capillary film will evaporate and deposit any solids it may carry in solution. The solid film thus deposited then acts as a wick, carrying more solution into the evaporation zone with the result that a crust of solid will form which in time may clog the apparatus. Reaction between nitrogen dioxide and reagent occurs in this crust and the resultant dye cannot reach the photometric system and low results are obtained. At other times, the colored crust may flake off and discolor the reagent thereby yielding false high results. It has been proposed to pre-saturate the air by bubbling through water but this expedient is impractical because nitrogen dioxide is quite soluble in water, thus serious errors in analysis occur.

(5) In conventional practice, large volumes of reagent are required for continuous operation. Normally between 1 and 5 ml. per minute of reagent are supplied to the gas absorption system. There is thus required from 10 to 50 liters of reagent per week. Preparation and storage of these quantities is inconvenient especially when outlying field monitoring stations must be serviced on a weekly basis. Reagent storage in these orders of magnitude also militate against easy portability of the analyzer. To minimize the reagent storage and handling problem, the expedient of using low reagent flows has been practiced. Unfortunately, this expedient introduces mechanical problems such as inefficient gas absorption, difficulty in maintaining constant reagent metering rate, as well as even slower instrumental response.

To avoid the need for frequent replenishment with large volumes of fresh reagent, it is current practice to recover spent colored reagent by filtering through activated carbon. The clarified reagent is then rejuvenated by addition of NEDA which the activated carbon removes along with color. While this eliminates the need for periodic preparation of large volumes of reagent, it does not eliminate the storage of large batches of recovered as well as spent reagent.

(6) The shelf life of conventional reagents is poor due to darkening caused by decompostion of NEDA. It is known that acid solutions of NEDA decompose in a few days. The diazotizable reagent is acidic. Thus, when optimum amount of NEDA is added to fresh or recovered reagent, there is no assurance that the optimum amount will still be there after several days or a week's operation. Analytical errors may thus be introduced due to darkening of reagent and depletion of NEDA content.

(7) Sulfur dioxide, a frequent co-pollutant in urban atmospheres, produces negative interference in conventional methods of nitrogen dioxide analysis. This interference is due to two effects. Sulfur dioxide is absorbed by reagent and reacts with nitrogen dioxide; it thus competes with reagent for the available nitrogen dioxide. Because the reaction between reagent and nitrogen dioxide is relatively slow, there is ample opportunity for the sulfur dioxide to remove some of the nitrogen dioxide. The second source of interference is the bleaching effect of sulfur dioxide on the azo dye. These forms of interference have been recognized but have been accepted as more a less unavoidable in normal air monitoring practice. While it is only moderate with low concentrations of sulphur dioxide, it can cause appreciable errors in highly polluted atmospheres. In environmental chambers, where exceptionally high concentrations of sulfur dioxide may be employed, this form of interference can cause serious negative errors.

(8) Conventional apparatus for nitrogen dioxide analysis was designed to accommodate the slow reaction time of currently used reagents. There would be little advantage in improving the chemistry of the procedure if improved apparatus were not available. There is, therefore, need for improved apparatus for capitalizing on any improvements effected in the chemistry of the process. Another problem with conventional apparatus is calibration of the solution metering pump, necessary to insure correct air to reagent ratio. Still another problem is loss of water from reagent due to evaporation into the air sample stream. When reagent is recovered and recycled continuously, some provision must be made for replacing the water lost by evaporation otherwise the system will ultimately run dry.

DEVELOPMENT OF NEW IMPROVED PROCEDURE

It is an object of the present invention to overcome these disadvantages of the prior art and to develop a procedure which is more compatible with modern, continuous air monitoring practice.

It is another object of this invention to obtain more rapid development of color to enhance response rate of instrument-reagent combination to changes in nitrogen dioxide concentration in air monitoring.

It is a further object of this invention, in air monitoring, to develop a reagent which will not dry out and form a solid deposit at the junction of the air and reagent streams in the gas liquid absorber.

It is a further object of this invention to develop a reagent formulation which can be recovered continuously for reuse in an air monitoring instrument to avoid the need for preparing and storing large volumes of reagent required for long continued unattended operation.

According to the present invention, the foregoing objectives have been accomplished and a new reagent formulation has been found which not only yields the sought for objectives but at the same time, possesses numerous recondite advantages, all of which, working in conjunction, combine to produce an unexpectedly superior analytical procedure.

The novel formulation of this invention utilizes 1-amino-2,5-benzenedisulfonic acid as the diazotizable compound in place of the sulfanilic acid or sulfanilamide used in conventional reagents. This chemical is also called 2-amino-p-benzenedisulfonic acid and is listed under this name in chemical supply catalogs. It will be referred to hereinafter by the abbreviation ABDSA. It is a comparatively cheap chemical, available commercially as a 70% technical grade product and is soluble to the extent of approximately 6 g. per 100 cc. water. The 70% technical product yields a pale brown water solution which can be completely decolorized with activated carbon.

A reagent suitable for nitrogen dioxide analysis can be prepared by dissolving 15 g. of 70% technical ABDSA in one liter of distilled water, adding 5 g. of powdered activated carbon, allowing the solution to stand cold for several hours, then filtering to remove the carbon. To one liter of clear colorless filtrate is then added 0.05 g. NEDA. This reagent forms a pink color immediately upon addition of a drop of dilute sodium nitrite solution. In contrast, the conventional Saltzman reagent based on sulfanilic acid begins to show color only after several seconds and the color then builds up slowly over several minutes. Final color density of the two reagents is practically equal and the color in both is stable for many hours.

Rate of color development of the two reagents, i.e. that of this invention and the Saltzman reagent, was measured quantitatively by means of a recording photometer equipped with a chart travelling at one inch per minute. For this measurement a measured quantity of the ABDSA reagent was placed in an optical cell in the photometer. The pen of the photometer was zeroed and one drop of 0.01% sodium nitrite solution was added with stirring. The pen of the recorder showed an immediate response to color development and the graph showed 90% of full color development in 0.3 minute. A similar measurement with Saltzman reagent showed much slower color development with 90% of full color development complete only after 1.26 minutes. The two curves are reproduced in FIG. 1 to illustrate graphically the great speed advantage of the new reagent of this invention. Comparison of the curves shows that the new reagent has over four times the reaction rate of the formulation based on sulfanilic acid. Various other formulations based on sulfanilic acid or sulfanilamide exhibited equally slow color development.

Reagents were made up with various concentrations of ABDSA, from 5 to 50 g. per liter, and rates of color development were compared and observed to be essentially equal, hence it is concluded that reaction rate is not materially influenced by ABDSA concentration.

Another advantage of the ABDSA reagent is that no other acid need be added. Thus, the odor and corrosion problem of acetic acid and the mold growth problem of citric and tartaric acid are avoided.

The problem of crust formation due to evaporation was ameliorated by substitution of ABDSA for sulfanilic acid or sulfanilamide. The latter substances are soluble to the extent of ca. 5 g. per liter thus when evaporation starts their solutions reach saturation sooner than ABDSA solution, which is soluble to the extent of ca. 60 g. per liter. While the lower crystallization tendency of ABDSA is an improvement, it may still be not enough to prevent crust formation entirely and, according to a preferred embodiment of this invention, this problem can be solved conclusively by incorporating a humectate in the reagent. Hygroscopic polyalcohols or mixtures thereof have been found to be suitable humectants such, for example as ethylene glycol, propylene glycol, glycerol, sorbitol, diethylene and triethylene glycol and the like. In the order of about 100 to 50 cc. per liter of reagent, preferably about 100 to 20 cc. per liter, they effectively and completely eliminate the crust formation problem and their effectiveness can be demonstrated by evaporating droplets of reagent with and without humectant. Reagent without humectant evaporates to form a hard solid crystalline mass whereas reagent with humectant leaves a mushy, semi-fluid mass. Presence of the humectant has no effect on sensitivity or rate of color development of the ABDSA reagent.

An important additional advantage is obtained, also, with the reagent containing humectant, i.e., the humectant acts as a wetting and spreading agent and thus, when the reagent is used in a wetted wall absorber, it spreads itself more uniformly over the walls of the absorber thereby improving its efficiency. This fact, plus the inherently faster reaction rate, permits the design of a more compact gas absorber for the final nitrogen dioxide analyzer.

As pointed out earlier, sulfur dioxide interferes negatively in conventional nitrogen dioxide analysis. The new ABDSA plus humectant formulation of this invention when tested for effect of sulfur dioxide was unexpectedly found to be vastly superior to conventional reagents for at least two reasons. Thus, because of the faster reaction rate, less nitrogen dioxide is lost to the competing reaction with sulfur dioxide and, furthermore, the dye formed by the new reagent is only very slowly bleached whereas dye from conventional reagents is bleached in a few minutes by sulfur dioxide. These facts were demonstrated by the following series of experiments:

15 cc. portions of various nitrogen dioxide reagents were placed in test tubes as follows:

A–1—The new reagent based on ABDSA plus humectant,
A–2—The new reagent based on ABDSA plus humectant to which was added 10 drops of saturated sodium bisulfite solution to put a high concentration of sulfur dioxide in solution,
B–1—A conventional sulfanilic acid based reagent,
B–2—A conventional sulfanilic acid based reagent to which was added 10 drops of saturated sodium bisulfite solution,
C–1—A conventional sulfanilamide based reagent,
C–2—A conventional sulfanilamide based reagent to which was added 10 drops of saturated sodium bisulfite solution.

To each of the above test tubes was added one drop of 0.01% sodium nitrite solution to yield the usual pink color. The following color reactions were observed:

A–1—Instantaneous color development which maintained its strength for many hours,
A–2—Instantaneous color development having the same color density as A–1 and which only showed discernable fading after one-half hour,
B–1—Considerably slower color development than A–1 but retaining its color strength for many hours,
B–2—Slower and much lighter color development than B–1 and rapid loss in 5–6 minutes of what little color which had been formed. Colorless in 10 minutes.
C–1—Rate of color development and color stability about like B–1,
C–2—Practically no color development to begin with.

The bleaching effect of sulfur dioxide on developed dye was demonstrated as follows:

To test tubes containing 15 cc. of developed dye solution corresponding to A–1, B–1, and C–1 of the previous experiment were added 10 drops of saturated sodium bisulfite solution. It was observed that A–1 retained practically all of its color strength for 30 minutes. B–1 and C–1 began to show appreciable loss of color in 5 to 6 minutes and were practically completely bleached in 10 to 15 minutes.

Freedom from negative interference by sulfur dioxide is of great advantage in monitoring for nitrogen dioxide in highly polluted urban atmospheres. It is also of great advantage in control of nitrogen dioxide concentration in environmental testing chambers containing simulated polluted atmospheres wherein sulfur dioxide would be one of the added pollutants.

Figure 2:
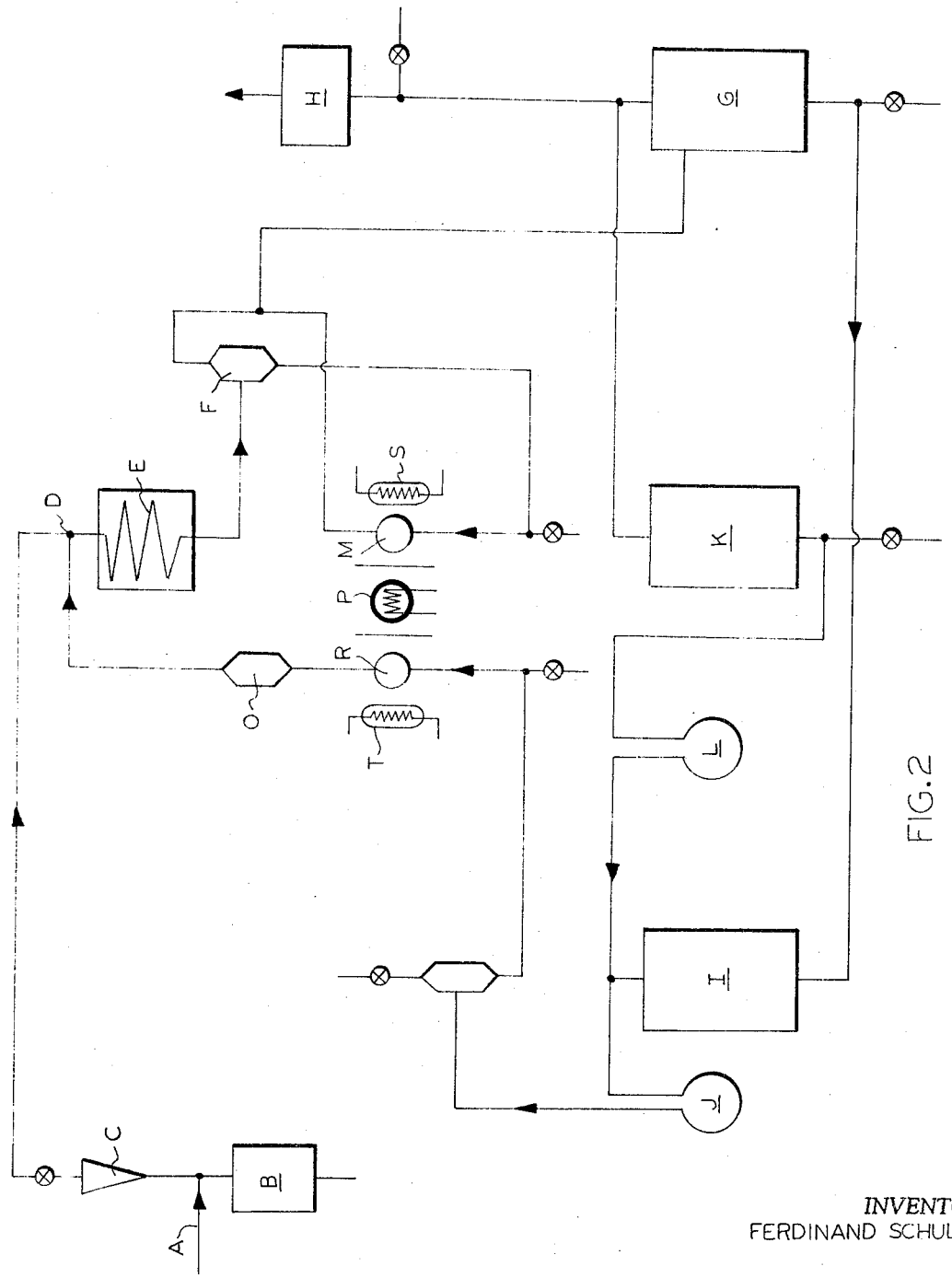

The new diazotizable ABDSA reagent of this invention containing humectant can be effectively recovered after use by filtration through a bed of activated carbon. Because the coupling agent, NEDA, is also removed by activated carbon, it is necessary, in order to maintain the optimum concentration of NEDA in the complete reagent while still retaining the desirable feature of recycling the reagent within the apparatus, to meter in a separate solution of NEDA, at a very slow rate, into the main metered stream of the new reagent. The method of accomplishing this is best explained by reference to FIG. 2, the flow diagram of the nitrogen dioxide analyzer. Blocks G, K, and I, in FIG. 2 represent reagent vessels of about one liter capacity. Blocks J and L represent metering pumps. Vessel G is normally kept about half filled with spent reagent from the analyzer. Spent reagent flows from the bottom of G into the bottom of I which is a one liter column about three-fourths filled with 30 mesh activated carbon. A plug of nylon fiber in the top of this column acts as a filter for the carbon. Metering pump J pumps clear recovered reagent from the top of I to the analyzer at a constant rate of ca. 1 cc. per minute. At the same time, metering pump L pumps a solution of NEDA from storage vessel K into the suction side of pump J at a constant rate of 0.025 cc. per minute, or 250 cc. per week. Since the optimum concentration of NEDA in the complete reagent is 0.05 g. per liter, the stock solution in K should contain 0.5 g. NEDA per 250 cc.

NEDA is unstable in water solution, even in the absence of added acid, and its solutions darken in a few days and in a few weeks practically all of the NEDA has disappeared. (NEDA is even less stable in acid solution.) It was discovered, however, that NEDA solutions can be preserved by including an alkaline substance such as sodium bicarbonate, sodium carbonate, potassium carbonate, and bicarbonate, sodium and potassium hydroxide and the like in the proportion of about 2 parts alkaline material to about 3 parts NEDA. Solutions so stabilized remain clear and retain full strength for a month or more. For use in a nitrogen dioxide analyzer, the NEDA solution is, therefore, preferably made up with about 0.5 g. NEDA and about 0.33 g. sodium bicarbonate to 250 cc. of water.

The addition of a separate stable solution of NEDA to the diazotizable reagent just prior to gas absorption has several advantages over older procedures which combined diazotizable reagent and coupling agent into a single stock solution. Most important is the elimination of large unwieldy batches of stock reagent. Discoloration of reagent and resultant errors in color measurement are avoided. By eliminating the decomposition of NEDA during storage, the optimum concentration in complete reagent is always assured. Addition of a solution of NEDA to the system yields still another unanticipated benefit by replenishing the water normally lost by evaporation. Normally from 200 to 300 cc. of water evaporate into the sample air stream per week, thus, the added 250 cc. of NEDA solution maintains the water content of the systems and improves the capacity of the system for unattended operation.

Flow diagram of a nitrogen dioxide analyzer which capitalizes on the superior performance of the new reagent is shown in FIG. 2. Operation of the analyzer is started by filling reagent reservoir G with about one liter of the new reagent having the following composition:

15 g. ABDSA (70% technical grade)
100 to 200 cc. ethylene glycol, glycerol, or diethylene glycol
Water to make one liter.

Normally, the reagent is first decolorized by treating with 5 g. of powdered activated carbon for several hours at room temperature and then filtering. This, however, is not essential because the reagent will be decolorized in passing through activated carbon filter I. Reagent is allowed to flow from G into I until all air has been displaced from the activated carbon filter.

To reservoir K is added 250 cc. of coupling reagent having the following composition:

0.5 g. NEDA
0.33 g. sodium bicarbonate
250 cc. water.

Both metering pumps J and L are then started in order to pump complete reagent into the analyzer. An air trap N is located in the reagent line to entrap any air that might have been included in the reagent stream due to incomplete deaeration of the activated carbon filter. Clear reagent then flows through reference flow cell R.

A 5 cc. pipette O located in the reagent line beyond the flow cell is for the purpose of calibrating the metering pumps. To calibrate the pumps, the pipette is emptied, the pumps are started and filling time is measured by means of a stop watch and pumping rate in cubic centimeters per minute is calculated.

Normally when analyzing for nitrogen dioxide in the 0 to 20 p.p.h.m. range a 1000 to 1 air to liquid volume ratio is used. For reagent pumping rate of ca 1 cc. per minute the air sample rate is adjusted, by means of rotameter C, to 1000 times the reagent flow. In this manner it is unnecessary to adjust the pump to an exact rate of delivery, which is a tedious operation. Knowing the reagent delivery rate, it is a simple matter to adjust air flow rate by means of the rotameter.

Sample air from valve A (which is a 3 way valve for switching from purifying column B to air to be analyzed) meets reagent at D and both flow concurrently down wetted wall absorber E. Column B containing activated carbon and soda lime is employed for purifying air for the purpose of zeroing the analyzer. E is a 10 turn, 3 in. diameter helix constructed of 4–5 mm. ID glass tubing. Reaction between nitrogen dioxide and reagent takes place in the helix; colored reagent is separated from air in separator F. Reagent flows through measuring cell M from whence it flows to spent reagent reservoir G. Motive power for the air stream is furnished by vacuum pump H.

The color measuring system consists of reference and measuring flow cells, R and M, photocells S and T, and a light source, P. Recorder and other accessories of the photometer are not shown in FIG. 2 because the type of equipment used for that purpose is unrelated to the chemistry or apparatus of the analyzer proper.

The analyzer as described is quite flexible with respect to concentration of nitrogen dioxide being analyzed. The above outlined specification describes the procedure for analyzing gases containing between 0 to 20 p.p.h.m. nitrogen dioxide. Range of the analyzer can be extended by reducing the air to reagent ratio, which can be done in two ways. Air flow can be reduced from ca 1000 cc. per minute to ca 100 cc. per minute to obtain a tenfold increase in range. On the other hand, reagent flow can be increased from ca 1 cc. per minute to 5 cc. per minute. When this is done, it is necessary to raise the NEDA content of the coupling reagent to 2.5 g. per 250 cc. to maintain the optimum concentration of 0.05 g. of NEDA per liter in the complete reagent.

The analyzer may be calibrated by placing a standard color solution in the measuring flow cell in which the color has been generated by adding a known quantity of sodium nitrite to the complete reagent. Alternately, the instrument can be dynamically calibrated by the method described in ASTM method D2012–63T.

ADVANTAGES OF NEW ANALYTICAL PROCEDURE OVER OLDER SYSTEMS (1) The nitrogen dioxide analyzing system of this invention responds to fluctuations in nitrogen dioxide content in sample air in 60 to 90 seconds in contrast to conventional systems which may require as much as 10 to 15 minutes for initial response.

(2) The new procedure is free of interference by sulfur dioxide.

(3) The new analyzer is capable of unattended operation for at least a week.

(4) Routine operation and maintenance is simple, requiring only the replenishment of about 250 cc. of NEDA solution per week. The activated carbon filter has long life and needs replacement only after 2 or 3 months operation.

(5) The ABDSA solution does not deteriorate with use, however, since it is inexpensive it is customary to refill with fresh solution when the carbon filter is changed.

(6) Because only small volumes of reagent are required and because the rapid reaction rate permits reducing the size of essential components, it has been possible to reduce the overall size of the analyzer. This improves the portability of the unit and reduces cost of construction.

(7) Because essential reagents are continuously recycled and reused and because of the infrequent need for servicing the cost of operating the analyzer is low.

(8) Formation of crust or solid deposit which may clog the gas absorber, due to evaporation, is avoided by the new reagent.

Various changes may be made in the details such as hereinbefore described without departing from the spirit or scope of the present invention.

What is claimed is:

1. A reagent for colorimetrically analyzing the nitrogen dioxide content of gases, said reagent containing 2-amino-p-benzenedisulfonic acid as a diazotizable compound and N-(1-naphtyl)-ethylene diamine dihydrochloride as a coupling component.

2. The reagent of claim 1 containing a humectant.

3. The reagent of claim 2 in which the humectant is a hygroscopic polyalcohol.

4. The reagent of claim 3 in which the N-(1-naphthyl)-ethylenediamine dihydrochloride contains a stabilizing amount of an alkaline stabilizing agent.

5. The reagent of claim 4, in which the N-(1-naphthyl)-ethylenediamine dihydrochloride contains a stabilizing quantity of sodium bicarbonate.

6. In a process of colorimetrically analyzing the nitrogen dioxide content of gases, the step of passing said gases through a liquid reagent containing 2-amino-p-benzenedisulfonic acid as the diazotizable component and N-(1-naphthyl)ethylenediamine dihydrochloride as the coupling component.

7. In a process of colorimetrically analyzing the nitrogen dioxide content of gases, the step of passing said gases through a liquid reagent containing a humectant, N-(1-naphthyl)ethylenediamine dihydrochloride as the coupling component and 2-amino-p-benzenedisulfonic acid as the diazotizable component.

8. The process of claim 7, in which the N-(1-naphthyl)-ethylenediamine dihydrochloride is in the form of a stabilized solution.

9. The process of claim 8, in which the humectant is selected from the group consisting of glycerol, ethylene glycol, and diethylene glycol.

10. In a process of colorimetrically analyzing the nitrogen dioxide content of gases, the step of passing said gases through a liquid reagent containing a humectant, N-(1-naphthyl)ethylenediamine dihydrochloride as the coupling component and 2-amino-p-benzenedisulfonic acid as the diazotizable component, the N-(1-naphthyl) ethylenediamine dihydrochloride being added to the 2-amino-p-benzenedisulfonic acid immediately prior to the gas absorption step.

References Cited

UNITED STATES PATENTS 3,375,079   3/1968   Lyshkow _____ 23—232

OTHER REFERENCES

C.A. 65:16046e (November 1966).

MORRIS O. WOLK, Primary Examiner

S. MARANTZ, Assistant Examiner

U.S. Cl. X.R.

23—254; 252—408